(12) United States Patent
Mukumoto et al.

(10) Patent No.: US 12,504,659 B2
(45) Date of Patent: Dec. 23, 2025

(54) PLANAR ILLUMINATION DEVICE WITH LOCAL DIMMING

(71) Applicant: MINEBEA MITSUMI Inc., Nagano (JP)

(72) Inventors: Suguru Mukumoto, Kitasaku-gun (JP); Shogo Suzuki, Kitasaku-gun (JP)

(73) Assignee: MINEBEA MITSUMI Inc., Nagano (JP)

(*) Notice: Subject to any disclaimer, the term of this patent is extended or adjusted under 35 U.S.C. 154(b) by 0 days.

(21) Appl. No.: 18/836,913

(22) PCT Filed: Dec. 28, 2022

(86) PCT No.: PCT/JP2022/048623
§ 371 (c)(1),
(2) Date: Aug. 8, 2024

(87) PCT Pub. No.: WO2023/157501
PCT Pub. Date: Aug. 24, 2023

(65) Prior Publication Data
US 2025/0035980 A1  Jan. 30, 2025

(30) Foreign Application Priority Data
Feb. 16, 2022  (JP) ................. 2022-022222

(51) Int. Cl.
*G02F 1/1335* (2006.01)
*G02B 27/01* (2006.01)
*G02F 1/13357* (2006.01)

(52) U.S. Cl.
CPC .. *G02F 1/133607* (2021.01); *G02F 1/133605* (2013.01); *G02B 27/0101* (2013.01); *G02B 2027/0118* (2013.01); *G02F 1/133603* (2013.01)

(58) Field of Classification Search
CPC ......... G02F 1/133607; G02F 1/133605; G02F 1/133603; G02B 27/0101; G02B 2027/0118
See application file for complete search history.

(56) References Cited

U.S. PATENT DOCUMENTS 10,895,782 B2  1/2021  Harada et al.
10,920,958 B2  2/2021  Nambara
(Continued)

FOREIGN PATENT DOCUMENTS

| JP | 2017-151404 A | 8/2017 |
| JP | 2018-083593 A | 5/2018 |

(Continued)

OTHER PUBLICATIONS

Mukumoto et al., WO_2022004036_A1_I, machine translation, Jan. 2022 (Year: 2022).*

(Continued)

*Primary Examiner* — Tracie Y Green
(74) *Attorney, Agent, or Firm* — Chrisman Gallo Tochtrop LLC (57) ABSTRACT

A planar illumination device according to an embodiment includes a plurality of light sources, a condenser lens, and a field lens. The plurality of light sources are disposed two-dimensionally on a substrate and light emission of the plurality of light sources is individually controlled. The condenser lens is disposed at an exit side of the light sources in parallel with the substrate and configured to condense light exiting from the light sources. The field lens is disposed at an exit side of the condenser lens, disposed inclined in at least one direction orthogonal to a plane parallel to the substrate, configured to spread light incident from the condenser lens outward, and disposed along a liquid crystal panel attached externally.

17 Claims, 8 Drawing Sheets

(56) References Cited

U.S. PATENT DOCUMENTS

| | | |
|---|---|---|
| 11,761,608 B2 | 9/2023 | Mukumoto et al. |
| 11,841,582 B2 | 12/2023 | Harada et al. |
| 2019/0056086 A1 | 2/2019 | Nambara |
| 2019/0094620 A1 | 3/2019 | Harada et al. |
| 2019/0179143 A1* | 6/2019 | Nambara ............ G02B 27/0149 |
| 2021/0124248 A1* | 4/2021 | Guo ..................... G03B 21/16 |
| 2021/0132442 A1 | 5/2021 | Harada et al. |
| 2022/0020318 A1* | 1/2022 | Sasaoka ............... G09G 3/2014 |
| 2023/0213167 A1 | 7/2023 | Mukumoto et al. |

FOREIGN PATENT DOCUMENTS

| | | |
|---|---|---|
| JP | 2019-061128 A | 4/2019 |
| JP | 2020-118935 A | 8/2020 |
| WO | 2022/004036 A1 | 1/2022 |

OTHER PUBLICATIONS

Yokoe, JP,2020-118935,A, machine translation,Jan. 2021 (Year: 2021).*
International Search Report for corresponding International Application No. PCT/JP2022/048623 mailed Mar. 14, 2023.
Written Opinion for corresponding International Application No. PCT/JP2022/048623 dated Mar. 14, 2023.
Notice of Reasons for Refusal dated Jun. 27, 2023 for corresponding Japanese Application No. 2022-022222 and English translation.
English translation of the Written Opinion for corresponding International Application No. PCT/JP2022/048623 mailed Mar. 14, 2023.

* cited by examiner

PLANAR ILLUMINATION DEVICE WITH LOCAL DIMMING

CROSS REFERENCE TO RELATED APPLICATIONS

This application is a national stage entry of International Application No. PCT/JP2022/048623, filed on Dec. 28, 2022, which claims priority to Japanese Patent Application 2022-022222, filed on Feb. 16, 2022, which is incorporated herein by reference.

TECHNICAL FIELD

The disclosure relates to a planar illumination device.

BACKGROUND

A head-up display (HUD) using a windshield or the like of an automobile is known (see, for example, JP 2018-83593 A and JP 2019-61128 A). Since a light source unit of such a head-up display is installed near a windshield exposed to sunlight, countermeasures against heat and stray light due to sunlight are taken in most cases.

For example, in a planar illumination device used as a backlight of a head-up display, a liquid crystal panel is disposed at an exit surface side of the planar illumination device, and one or more mirrors are provided at subsequent stages of the liquid crystal panel, and projection is performed on a windshield. Thus, the liquid crystal panel and the planar illumination device may be deteriorated by heat of sunlight entering from the outside of the automobile through the windshield and the mirror, or stray light may adversely affect display.

As a countermeasure against this problem, the liquid crystal panel is disposed in most cases so as to be inclined in the same direction as a first-stage mirror with respect to a main optical axis from the planar illumination device to the first-stage mirror. Since the liquid crystal panel is disposed in an inclined state, sunlight entering in a direction opposite to a direction at the time of projection is easily reflected at the surface of the liquid crystal panel, and entry of the sunlight into the liquid crystal panel and the planar illumination device is prevented. Thus, a problem caused by heat and stray light is reduced.

SUMMARY

The inclination of the above-described liquid crystal panel causes no particular problem in a planar illumination device not supporting local dimming, but causes a new problem of reducing a contrast and luminance uniformity in a planar illumination device supporting local dimming. Local dimming is a technique of significantly increasing a contrast ratio between different areas in the same screen by controlling the light amount of each light source in a direct-type planar illumination device including two-dimensionally disposed light sources such as light emitting diodes (LEDs).

That is, in most cases, this type of planar illumination device is provided with characteristics of light distribution open outward so that the visibility at a peripheral edge is not deteriorated even when light is converged by a concave mirror used as a part of subsequent stages. Thus, when the liquid crystal panel is disposed inclined with respect to a main optical axis of the planar illumination device, a difference in optical distance is made between a field lens for providing characteristics of light distribution open outward and the liquid crystal panel. Due to this difference in optical distance, light going out of a zone area of local dimming (dimming zone) is generated, and a contrast and luminance uniformity are reduced.

The disclosure has been made in light of the foregoing, and an object is to provide a planar illumination device capable of improving a contrast and luminance uniformity.

To solve the above-described problem and achieve the object, a planar illumination device according to one aspect of the disclosure includes a plurality of light sources, a condenser lens, and a field lens. The plurality of light sources are disposed two-dimensionally on a substrate, and light emission of the plurality of light sources is individually controlled. The condenser lens is disposed at an exit side of the light sources in parallel with the substrate and configured to condense light exiting from the light sources. The field lens is disposed at an exit side of the condenser lens, disposed inclined in at least one direction orthogonal to a plane parallel to the substrate, configured to spread light incident from the condenser lens outward, and disposed along a liquid crystal panel attached externally.

A planar illumination device according to an aspect of the disclosure can improve a contrast and luminance uniformity.

DESCRIPTION OF EMBODIMENTS

A planar illumination device according to an embodiment will be described below with reference to the drawings. Note that the disclosure is not limited to the embodiment. Furthermore, the dimensional relationships between elements, proportions of the elements, and the like in the drawings may differ from reality. In some cases, the dimensional relationship and the ratios in the drawings may differ from each other. Furthermore, the contents described in one embodiment or modification example are applied in principle to other embodiments or modification examples.

Figure 1:
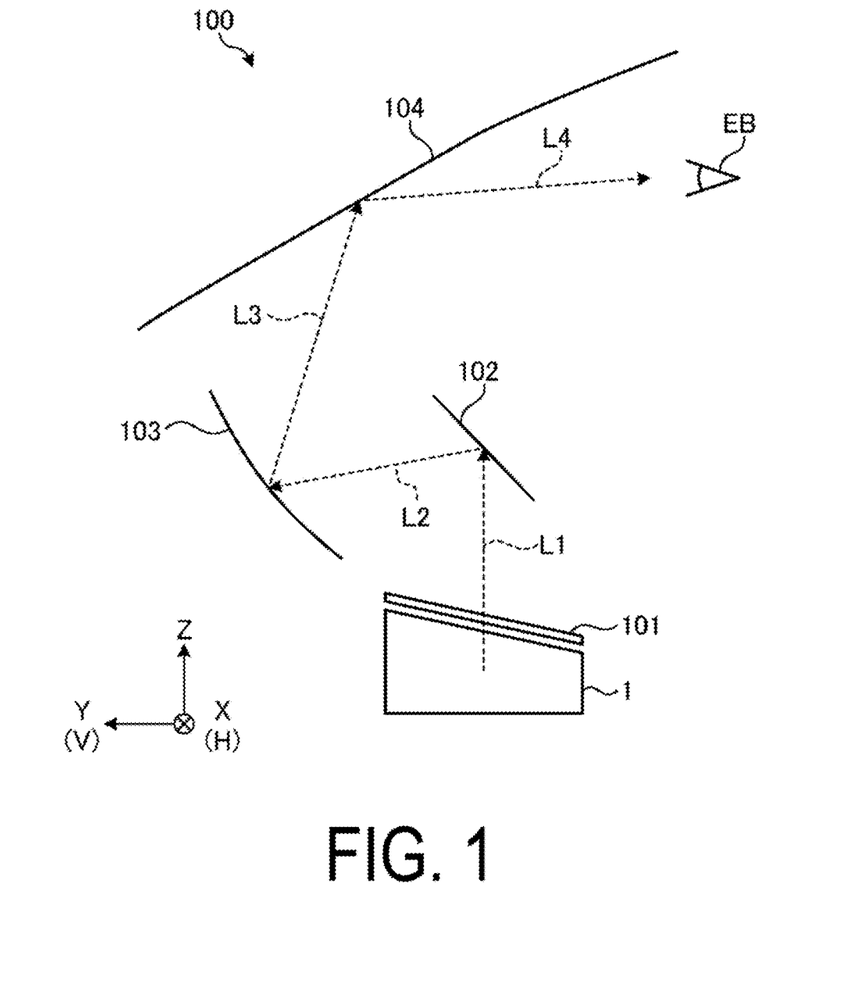
FIG. 1 is a diagram illustrating a configuration example of a head-up display system.

FIG. 1 is a diagram illustrating a configuration example of a head-up display system 100. In FIG. 1, in the case of the head-up display system 100 installed at an automobile, the traveling direction of the automobile is the left direction (positive direction of a Y-axis) in the drawing.

In FIG. 1, light exiting from a planar illumination device 1 passes through a liquid crystal panel 101 (L1), is reflected by a mirror 102 (L2), and is guided to a concave mirror 103.

A windshield 104 of the automobile is irradiated with light (L3) reflected from the concave mirror 103, light (L4) reflected by the windshield 104 enters an eye box (field of vision) EB of a driver or the like, and an image displayed at the liquid crystal panel 101 is recognized as a virtual image. Note that "H (horizontal direction)" written along with an X-axis direction and "V (vertical direction)" written along with a Y-axis direction are a horizontal direction and a vertical direction of the virtual image viewed from the eye box EB.

In addition, the liquid crystal panel 101 is disposed so as to be inclined in the same direction as the mirror 102 with respect to a main optical axis (L1) from the planar illumination device 1 toward the mirror 102 at a first state. The liquid crystal panel 101 is disposed in an inclined state, and thus when sunlight emitted from above the windshield 104 enters the liquid crystal panel 101 via the windshield 104, the concave mirror 103, and the mirror 102, the sunlight is easily reflected at the surface of the liquid crystal panel 101. As a result, the sunlight is prevented from entering the liquid crystal panel 101 and the planar illumination device 1, and thus a problem caused by heat and stray light is reduced.

Note that the components and arrangement of the head-up display system 100 in FIG. 1 are mere examples, and the optical axis of the planar illumination device 1 may be set in the horizontal direction, or the configuration of the mirrors, including the number of the mirrors, may be different.

Figure 2:
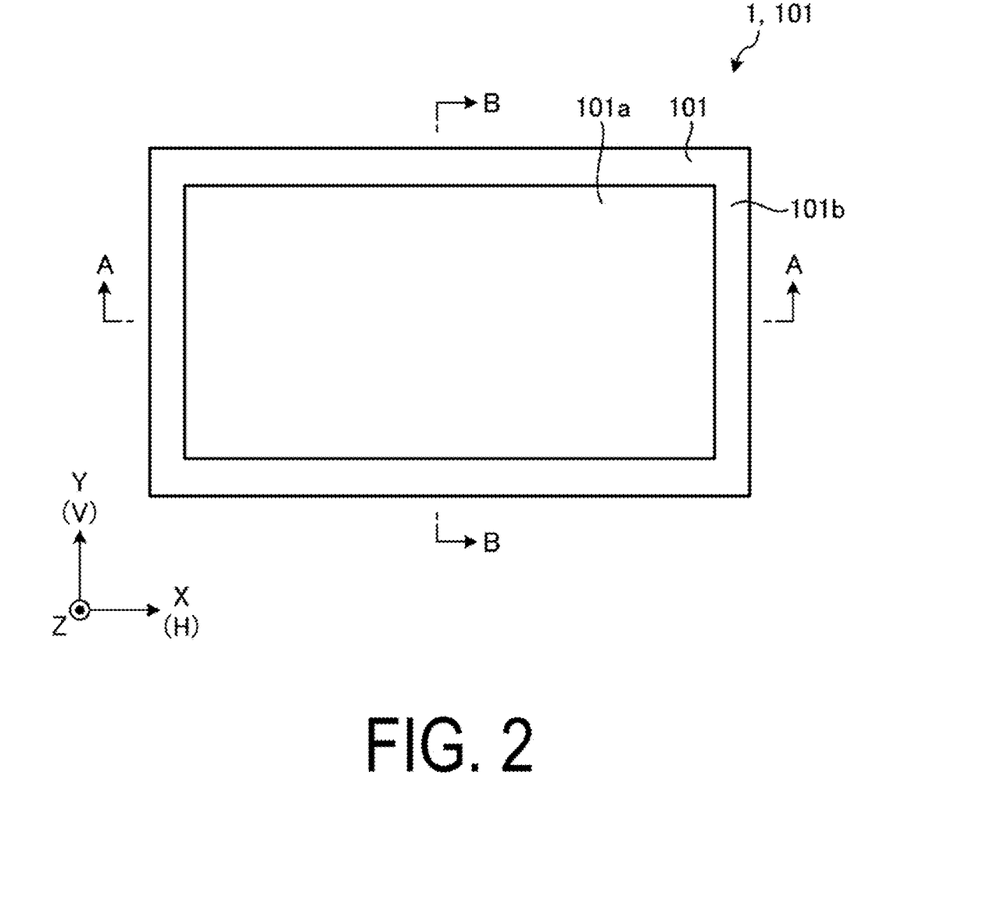
FIG. 2 is a plan view of a planar illumination device installed with a liquid crystal panel.

FIG. 2 is a plan view of the planar illumination device 1 installed with the liquid crystal panel 101. For convenience, a bottom surface of the planar illumination device 1 is in an X-Y plane and the thickness direction of the planar illumination device 1 is defined as a Z direction. In a use state of light being reflected by the windshield 104 and being visible to a user, the X-axis direction corresponds to the horizontal direction (H) and the Y-axis direction corresponds to the vertical direction (V), as already illustrated in FIG. 1. Note that, in the following, the horizontal direction and the vertical direction in the use state of the light being reflected by the windshield 104 and being visible to the user may be simply referred to as a "horizontal direction" and a "vertical direction", respectively.

In FIG. 2, the outer planar shape of the planar illumination device 1 is substantially rectangular, and the liquid crystal panel 101 is disposed at an exit surface. The periphery of the liquid crystal panel 101 serves as a frame edge part 101b, and the liquid crystal panel 101 inside the frame edge part 101b serves as a display area 101a.

Figure 3:
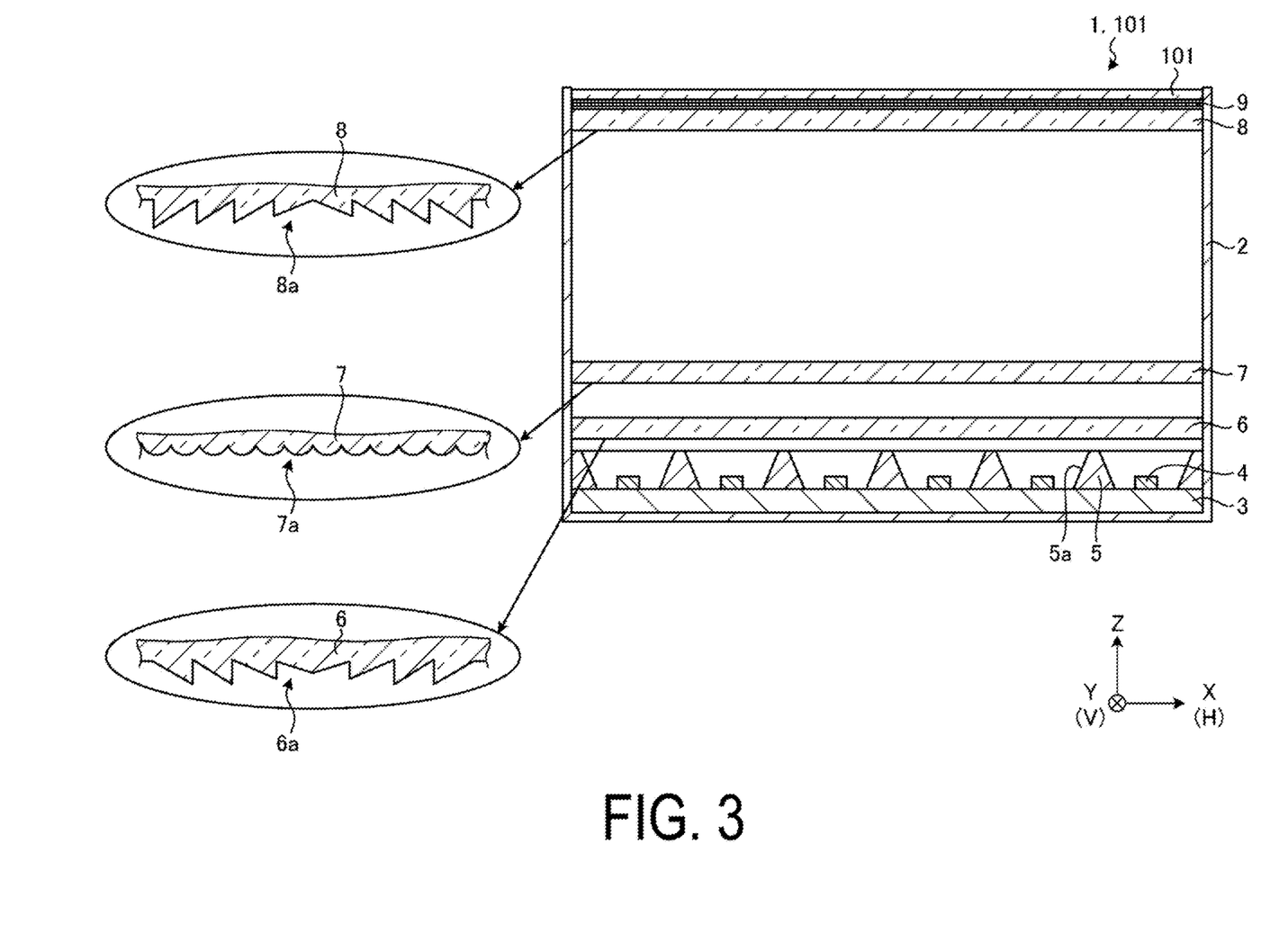
FIG. 3 is a cross-sectional view taken along line A-A in FIG. 2.
Figure 4:
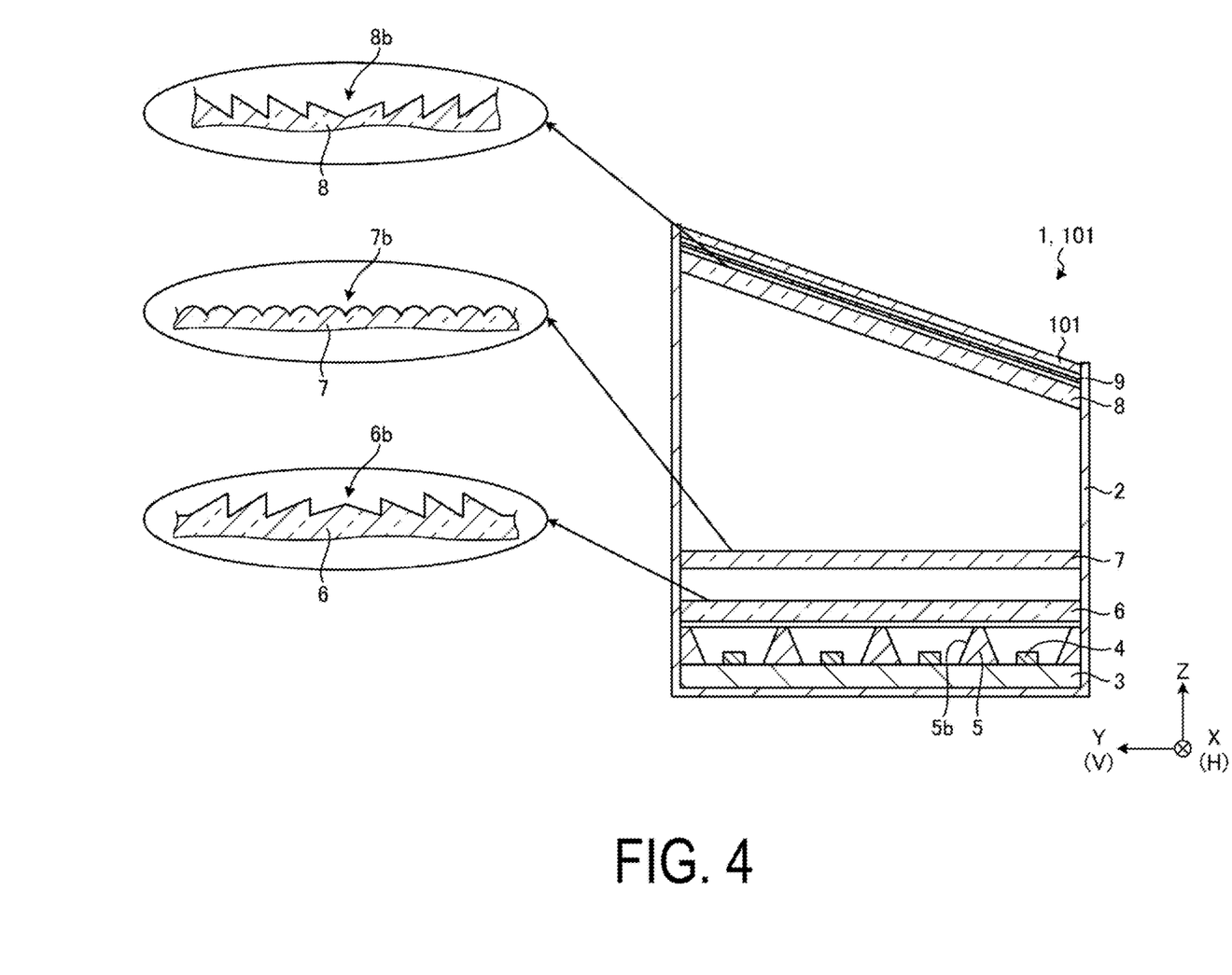
FIG. 4 is a cross-sectional view taken along line B-B in FIG. 2.

FIG. 3 is a cross-sectional view taken along line A-A in FIG. 2. FIG. 4 is a cross-sectional view taken along line B-B in FIG. 2. In FIGS. 3 and 4, the planar illumination device 1 includes a box-shaped frame 2 with a bottom. At a bottom part of the frame 2, a substrate 3 formed of aluminum or the like excellent in heat dissipation is disposed. A plurality of light sources 4 such as light emitting diodes (LEDs) are disposed two-dimensionally in a grid pattern at the substrate 3 after being appropriately insulated. The individual light sources 4 are individually driven and light emission is individually controlled, so that so-called local dimming is supported.

A reflector 5 including four reflection surfaces 5a and 5b surrounding each of the plurality of light sources 4 is disposed at an exit side of the substrate 3. At the exit side, the light sources 4 are disposed. The reflector 5 is made of resin or the like. The reflector 5 may be disposed in a state of floating from the light sources 4. The reflector 5 may be omitted.

A condenser lens 6 for concentrating light is disposed at an exit side of the reflector 5 in parallel with the substrate 3. As described in FIG. 3, the condenser lens 6 is formed with a linear Fresnel lens 6a at a lower incident surface in the drawing, and the linear Fresnel lens 6a includes grooves constituting an uneven surface of the lens and extending in one direction (depth direction (Y-axis direction) in FIG. 3). Furthermore, as described in FIG. 4, the condenser lens 6 is formed with a linear Fresnel lens 6b at an upper exit surface in the drawing, and the linear Fresnel lens 6b includes grooves constituting an uneven surface of the lens and extending in a direction (left-right direction (X-axis direction) in FIG. 3) orthogonal to the one direction of the lower surface. Each of the linear Fresnel lenses 6a and 6b has a prism structure. In the prism structure, a cylindrical convex lens is formed as the Fresnel lens. The grooves are periodically formed in accordance with the pitch of the light sources 4 disposed immediately below, and the angle of the prism is inverted at a segment boundary between adjacent segments. This Fresnel lens is manufactured more easily than an annular Fresnel lens.

A field lens 7 for spreading light distribution is disposed at an exit side of the condenser lens 6. As described in FIG. 3, the field lens 7 is formed with a lenticular lens 7a at a lower surface in the drawing, and the lenticular lens 7a includes grooves constituting an uneven surface of the lens and extending in one direction (depth direction (Y-axis direction) in FIG. 3). As described in FIG. 4, the field lens 7 is formed with a lenticular lens 7b at an upper surface in the drawing, and the lenticular lens 7b includes grooves constituting an uneven surface of the lens and extending in a direction (left-right direction (X-axis direction) in FIG. 3) orthogonal to the one direction of the lower surface. The lenticular lenses 7a and 7b have a prism shape with a semi-cylindrical cross section and spread incident light. A diffuser plate spreads light in all directions and thus reduces efficiency. However, the lenticular lenses 7a and 7b are advantageous in that the spread of light distribution can be adjusted within a necessary range based on the cross-sectional shape and that light efficiency is not reduced.

At an exit side of the field lens 7, a field lens 8 for spreading light distribution outward is disposed. The reason to spread light distribution is to provide characteristics of light distribution open outward so that the visibility at the peripheral edge is not deteriorated even when light is converged by the concave mirror 103 included in the head-up display system 100 (FIG. 1). As illustrated in FIG. 3, the field lens 8 is not inclined with respect to the X-axis direction (horizontal direction) and is disposed in parallel with the substrate 3, the condenser lens 6, and the field lens 7. Moreover, regarding the Y-axis direction (vertical direction), the field lens 8 is disposed inclined with respect to the substrate 3, the condenser lens 6 and the field lens 7 as illustrated in FIG. 4.

As illustrated in FIG. 3, the field lens 8 is formed with a linear prism 8a at a lower surface in the drawing, and the linear prism 8a includes grooves constituting an uneven surface of the lens and extending in one direction (depth direction (Y-axis direction) in FIG. 3). As illustrated in FIG. 4, the field lens 8 is formed with a linear prism 8b at an upper surface in the drawing, and the linear prism 8b includes grooves constituting an uneven surface of the lens and extending in a direction (left-right direction (X-axis direction) in FIG. 3) orthogonal to the one direction of the lower surface. The linear prisms 8a and 8b cause light passing through a center part of the entire width to travel straight in the Z-axis direction, and the optical axis is directed outward at each location closer to the outside. Note that the light passing through the center part of the entire width may also be inclined with respect to the Z-axis direction.

At an exit side of the field lens 8, an optical sheet 9 matching the characteristics of the liquid crystal panel 101 to be mounted is disposed in parallel with the field lens 8. As the optical sheet 9, a polarization reflective sheet or a diffusion sheet is used. The optical sheet 9 has a thickness of, for example, about 0.4 mm.

At an exit side of the optical sheet 9, the liquid crystal panel 101 for forming an image to be projected is disposed in parallel with the optical sheet 9 and the field lens 8. What is important here is that a uniform optical distance is kept between the field lens 8 and the liquid crystal panel 101. It is also important that both the field lens 8 and the liquid crystal panel 101 are close to each other. The amount of light spreading toward an adjacent dimming zone can be made smaller as the distance between the field lens 8 and the liquid crystal panel 101 decreases, so that the loss of light is reduced and the contrast is improved. The distance between the field lens 8 and the liquid crystal panel 101 may be zero (close to each other in a state of having substantially no clearance), but is preferably equal to or less than 3 mm, more preferably equal to or less than 2 mm, in consideration of the optical characteristics, the thickness of the optical sheet 9 when the optical sheet 9 is provided, the thickness of a positioning mechanism of each optical member, and the like. Note that as long as the field lens 8 and the liquid crystal panel 101 are as close as 3 mm or less from each other, the field lens 8 and the liquid crystal panel 101 are not necessarily disposed in parallel.

Figure 5:
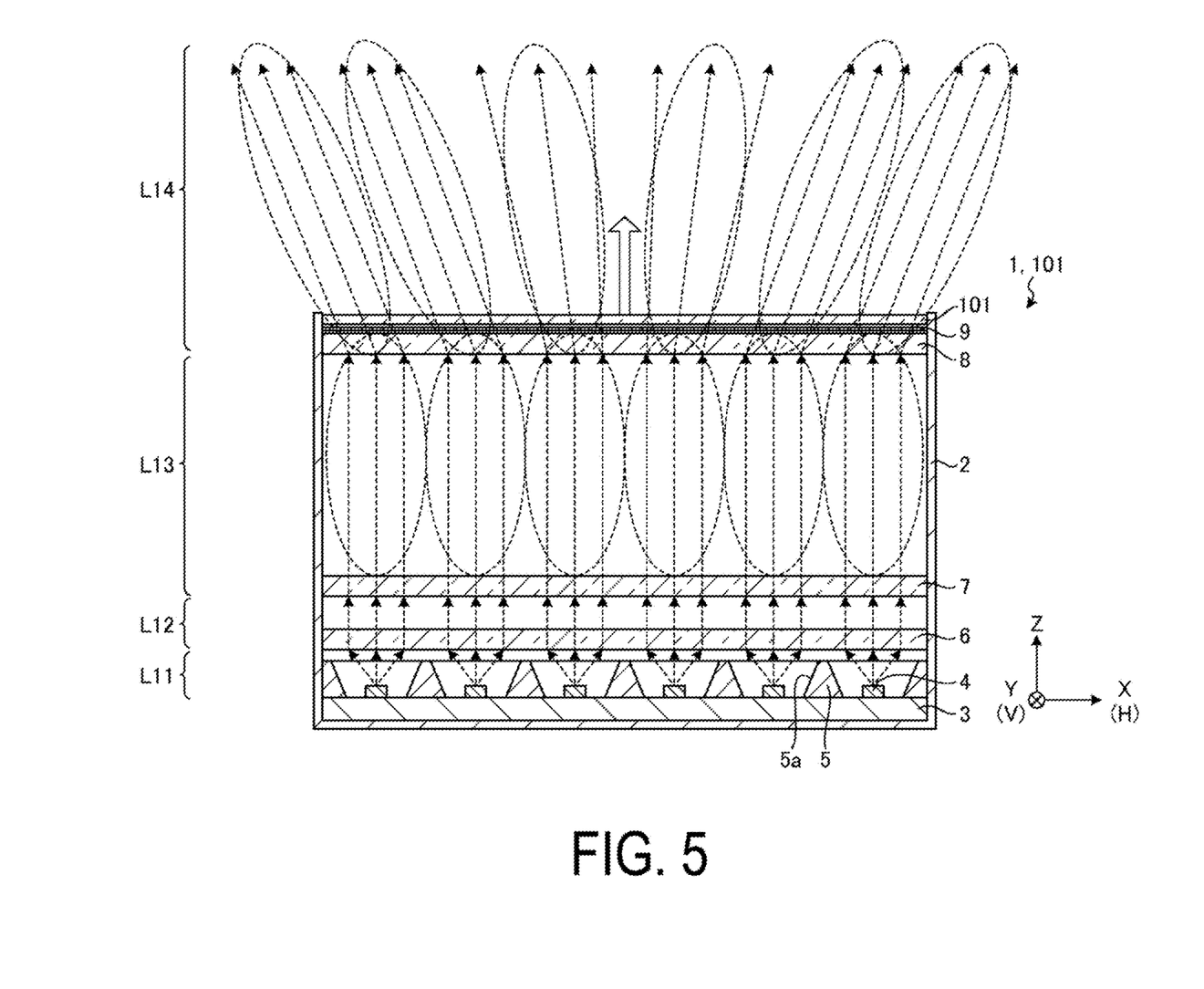
FIG. 5 is a diagram illustrating an example of light distribution in a horizontal direction (X-axis direction).

FIG. 5 is a diagram illustrating an example of light distribution in the horizontal direction (X-axis direction). In FIG. 5, light L11 exiting from the light sources 4 is converged into substantially parallel light by the condenser lens 6 (the linear Fresnel lens 6a at the lower surface) to become light L12. The light distribution of the light L12 is spread by the field lens 7 (the lenticular lens 7a at the lower surface) without change in the optical axis, and light L13 is formed. The optical axis of the light L13 at each location is inclined outward by the field lens 8 (the linear prism 8a at the lower surface), the light distribution is spread outward, and light L14 passing through the optical sheet 9 and the liquid crystal panel 101 is formed.

Figure 6:
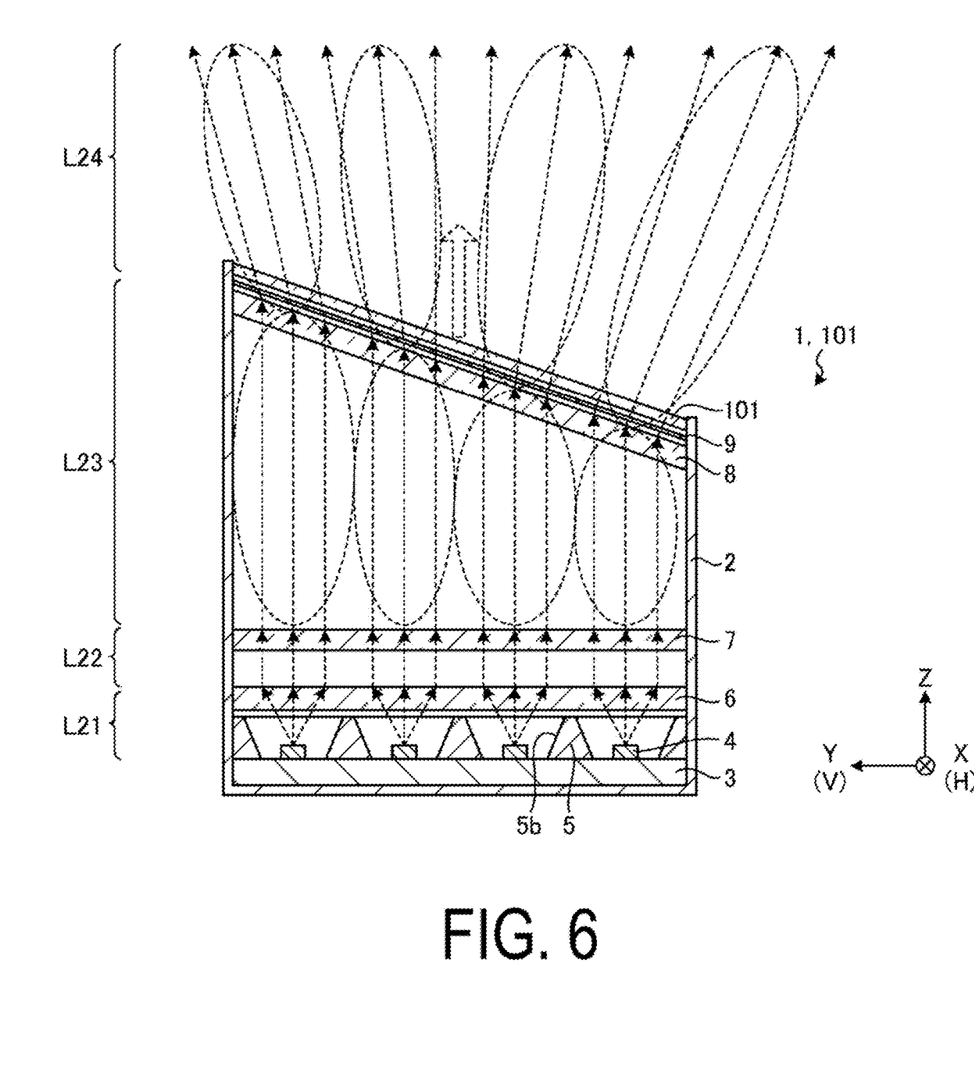
FIG. 6 is a diagram illustrating an example of light distribution in a vertical direction (Y-axis direction).

FIG. 6 is a diagram illustrating an example of light distribution in the vertical direction (Y-axis direction). In FIG. 6, light L21 exiting from the light sources 4 is converged into substantially parallel light by the condenser lens 6 (the linear Fresnel lens 6b at the upper surface) to become light L22. The light distribution of the light L22 is spread by the field lens 7 (the lenticular lens 7b at the upper surface) without change in the optical axis, and light L23 is formed. The optical axis of the light L23 at each location is inclined outward by the field lens 8 (the linear prism 8b at the upper surface), the light distribution is spread outward, and light L24 passing through the optical sheet 9 and the liquid crystal panel 101 is formed.

Figure 7:
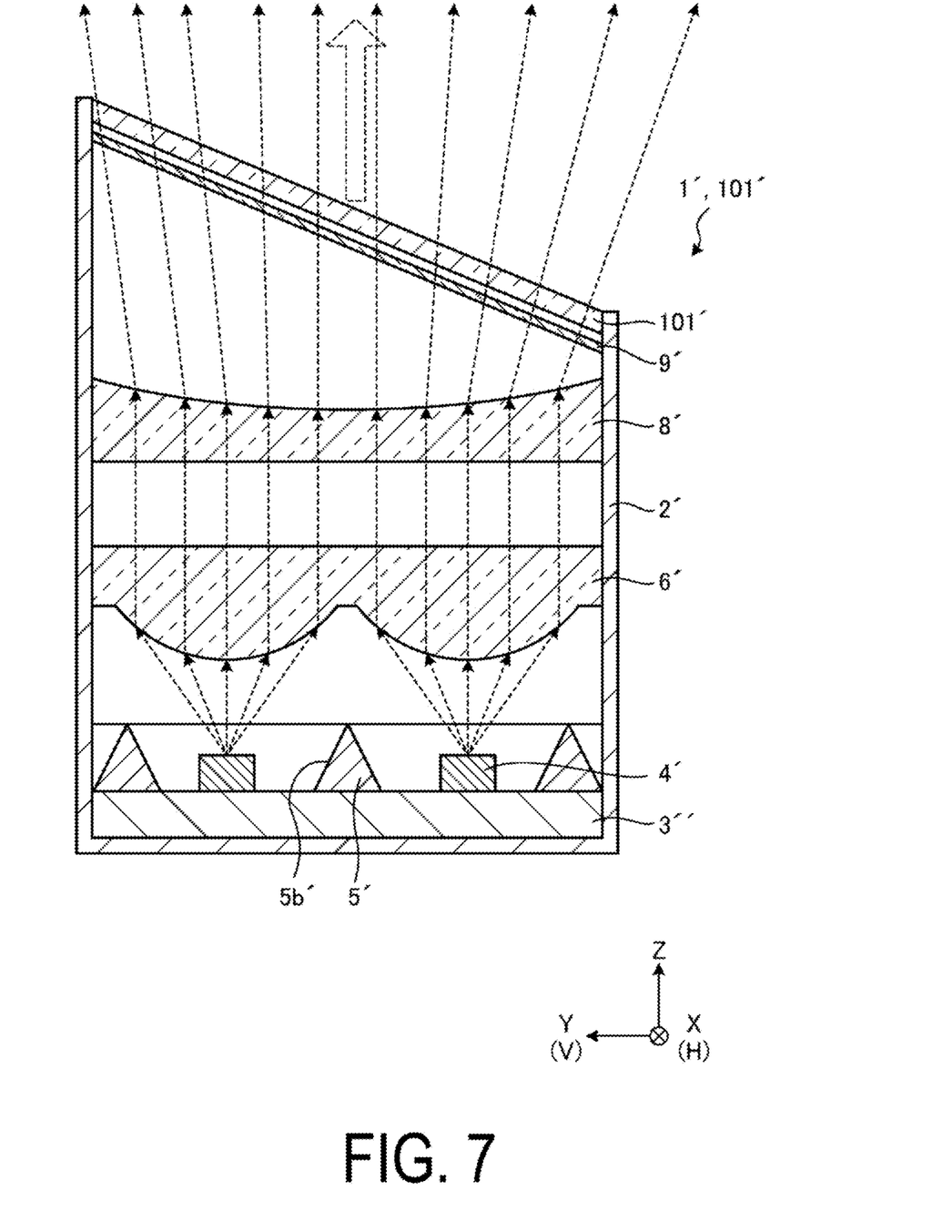
FIG. 7 is a diagram illustrating a configuration example of a planar illumination device and a liquid crystal panel according to Comparative Example #1 and an example of light distribution in a vertical direction (Y-axis direction).

FIG. 7 is a diagram illustrating a configuration example of a planar illumination device 1' and a liquid crystal panel 101' according to Comparative Example #1 and an example of light distribution in the vertical direction (Y-axis direction). In FIG. 7, the planar illumination device 1' according to Comparative Example #1 does not support local dimming. That is, a substrate 3', light sources 4', a reflector 5', a condenser lens 6', a field lens 8', an optical sheet 9' and the liquid crystal panel 101' are disposed at a frame 2' in this order from a bottom part, and the whole is covered by a small number of light sources 4'. Thus, there is no concept of a zone area in local dimming, and even when the optical distance between the field lens 8' and the liquid crystal panel 101' is not uniform, there is no problem about a dimming zone. However, at an end part (left end in FIG. 7) having a largest optical distance, a light beam is incident on the frame 2', so that the loss of light occurs.

Figure 8:
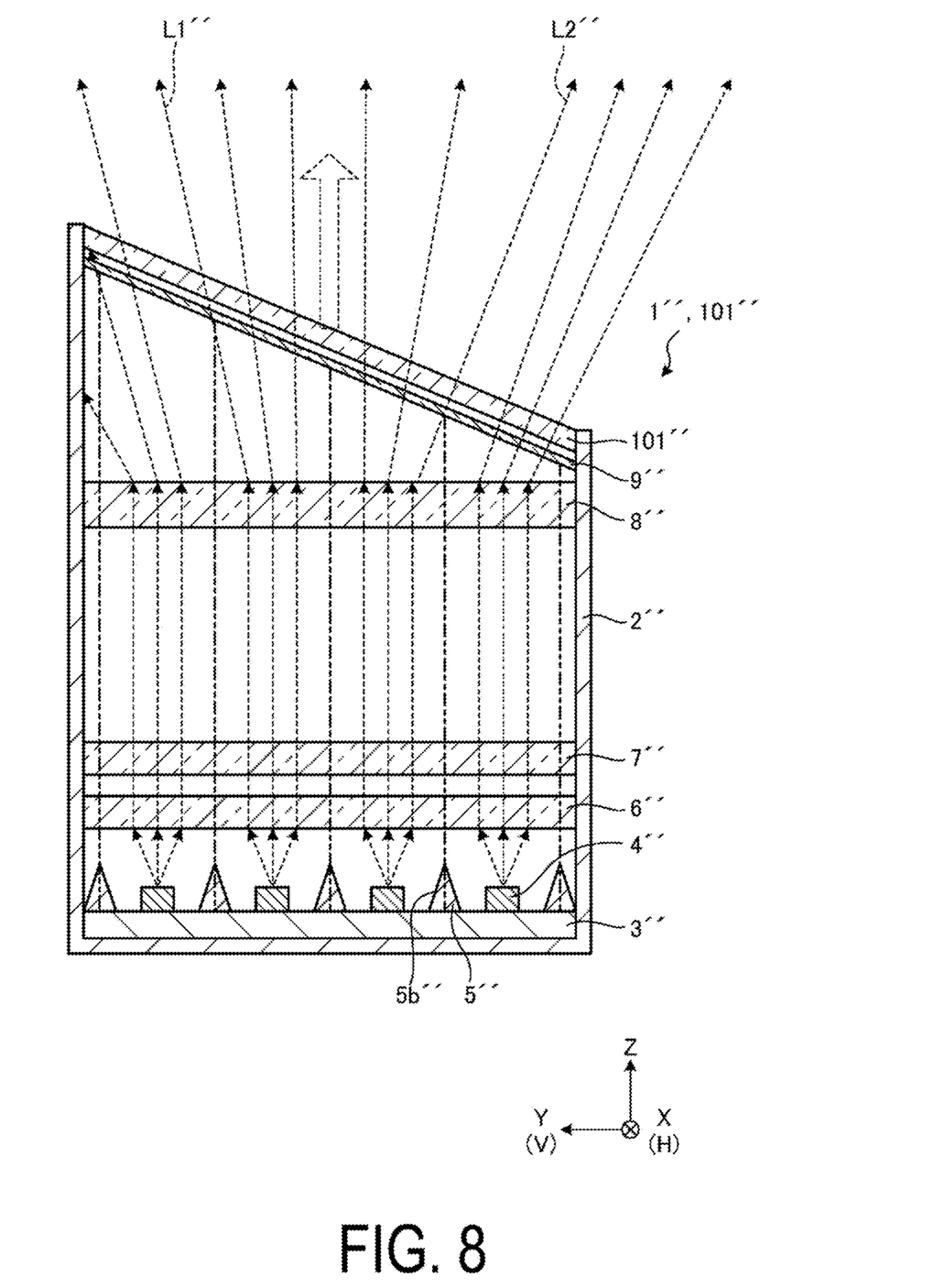
FIG. 8 is a diagram illustrating a configuration example of a planar illumination device and a liquid crystal panel according to Comparative Example #2 and an example of light distribution in a vertical direction (Y-axis direction).

FIG. 8 is a diagram illustrating a configuration example of a planar illumination device 1" and a liquid crystal panel 101" according to Comparative Example #2 and an example of light distribution in the vertical direction (Y-axis direction). In FIG. 8, the planar illumination device 1" according to Comparative Example #2 supports local dimming. A substrate 3", light sources 4", a reflector 5", a condenser lens 6", a field lens 7", a field lens 8", an optical sheet 9", and a liquid crystal panel 101" are disposed at a frame 2" in this order from a bottom part. However, the field lens 8" is disposed in parallel with the substrate 3", the condenser lens 6", and the field lens 7".

Thus, light going out of a zone area of local dimming is generated. The zone area corresponds to each light source 4" and is surrounded by vertically extending two-dot-dash lines. For example, light beams L1" and L2", and the like in FIG. 8 are light beams going out of zone areas of local dimming. Such light deteriorates the contrast and luminance uniformity. That is, unnecessary light is given due to light going into an adjacent zone area when the adjacent zone area is off (the light amount is zero). Furthermore, the light amount in the original zone area of the light going into the adjacent zone area becomes also insufficient, so that the contrast and luminance uniformity are reduced as a whole.

In this regard, since a uniform optical distance is kept between the field lens 8 and the liquid crystal panel 101 in the above-described embodiment as illustrated in FIG. 6, the generation of light going out of zone areas of local dimming is suppressed, and the contrast and luminance uniformity can be prevented from being reduced and can be improved. In addition, since the field lens 8 and the liquid crystal panel 101 are close to each other, these effects are more efficiently exerted. Note that the present embodiment can also be applied to a normal backlight not supporting local dimming and exerts a certain effect. That is, in the case of the planar illumination device 1' not supporting local dimming in FIG. 7, a light beam is incident on the frame 2' at an end part (left end in FIG. 7) having a largest optical distance, so that the loss of light occurs. However, when the configuration of the present embodiment is applied, the loss of light at the end part can be prevented.

The embodiment of the disclosure has been described above; however, the disclosure is not limited to the above-mentioned embodiment and may be modified in various ways without departing from the gist of the disclosure.

As described above, a planar illumination device according to an embodiment includes a plurality of light sources disposed two-dimensionally on a substrate, light emission of the plurality of light sources being individually controlled, a condenser lens disposed at an exit side of the light sources in parallel with the substrate and configured to converge light exiting from the light sources into substantially parallel light, and a field lens disposed at an exit side of the condenser lens, disposed inclined in at least one direction orthogonal to a plane parallel to the substrate, and configured to spread light incident from the condenser lens outward to have a uniform optical distance between the field lens and a liquid crystal panel attached externally. Thus, the contrast and luminance uniformity can be improved. That is, even when the field lens spreads the light incident from the condenser lens outward, it is possible to suppress the generation of light going out of zone areas of local dimming and to prevent the contrast and luminance uniformity from being reduced since the uniform optical distance is kept between the field lens and the liquid crystal panel. Note that the present embodiment can also be applied to a normal backlight not supporting local dimming and exerts a certain effect.

Further, the field lens is provided in vicinity to the liquid crystal panel. Thus, the amount of light spread by the field lens toward an adjacent dimming zone can be reduced, so that the loss of light is reduced, and the contrast is improved.

Further, the condenser lens is formed with linear Fresnel lenses including grooves forming unevenness at an incident side and at an exit side, directions of the grooves being orthogonal to each other. The field lens is formed with linear prisms at an incident side and at an exit side, the linear prisms including grooves, the grooves forming unevenness and extending in orthogonal directions. Thus, the condenser lens can be easily achieved.

The planar illumination device also includes another field lens provided between the condenser lens and the field lens and in parallel with the substrate. The other field lens is formed with lenticular lenses including grooves forming unevenness at an incident side and at an exit side, directions of the grooves being orthogonal to each other. As a result, the luminance uniformity can be improved without reduction in light efficiency as in the case of a diffusion plate.

Furthermore, the planar illumination device includes a reflector disposed at an exit side of the substrate, the reflector including reflection surfaces surrounding the light sources. As a result, light leaking from the light sources toward the substrate is not wasted, and the light efficiency is improved.

The planar illumination device also includes an optical sheet composed of a polarization reflective sheet or a diffusion sheet, the optical sheet being disposed at an exit side of the field lens disposed in an inclined manner. Thus, it is easy to achieve optical characteristics corresponding to the liquid crystal panel attached externally.

Moreover, a planar illumination device illuminates a liquid crystal panel disposed inclined with respect to an optical axis. The planar illumination device includes a plurality of light sources disposed two-dimensionally on a substrate, and light emission of the plurality of light sources being individually controlled, a condenser lens at an exit side of the light sources, the condenser lens being configured to converge light exiting from the light sources into substantially parallel light, and a field lens disposed at an exit side of the condenser lens and configured to spread light incident from the condenser lens outward, wherein the field lens is disposed in parallel with and in vicinity to the liquid crystal panel attached externally. Thus, the contrast and luminance uniformity can be improved.

Furthermore, a planar illumination device illuminates a liquid crystal panel disposed inclined with respect to an optical axis. The planar illumination device includes a plurality of light sources disposed two-dimensionally on a substrate, and light emission of the plurality of light sources being individually controlled, a condenser lens at an exit side of the light sources, the condenser lens being configured to converge light exiting from the light sources into substantially parallel light, and a field lens disposed at an exit side of the condenser lens and configured to spread light incident from the condenser lens outward, wherein the field lens is disposed in vicinity to the liquid crystal panel attached externally. Thus, the contrast and luminance uniformity can be improved.

In addition, the field lens is as close as 3 mm or less from the liquid crystal panel. Thus, a predetermined effect can be expected.

The disclosure is not limited to the embodiment described above. A configuration obtained by appropriately combining the above-mentioned components is also included in the disclosure. Further effects and modification examples can be easily derived by a person skilled in the art. Thus, a wide range of aspects of the disclosure is not limited to the embodiment described above and may be modified variously.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. A planar illumination device, comprising:
   a plurality of light sources disposed two-dimensionally on a substrate, wherein the plurality of light sources allow for local dimming and are separately controlled;
   a reflector disposed at an exit side of the substrate, the reflector having reflection surfaces surrounding each light source of the plurality of light sources;
   a condenser lens disposed at an exit side of the plurality of light sources in parallel with the substrate and configured to condense light exiting from the plurality of light sources; and
   a field lens disposed at an exit side of the condenser lens, disposed inclined in at least one direction orthogonal to a plane parallel to the substrate, formed with a plurality of linear prisms configured to spread light incident from the condenser lens outward, and disposed along a liquid crystal panel attached externally.

2. The planar illumination device according to claim 1, wherein
   the field lens is provided in vicinity to the liquid crystal panel.

3. The planar illumination device according to claim 1, wherein
   the condenser lens is formed with linear Fresnel lenses including grooves forming unevenness at an incident side and at an exit side, directions of the grooves being orthogonal to each other, and
   the field lens is formed with linear prisms including grooves forming unevenness at an incident side and at an exit side, directions of the grooves being orthogonal to each other.

4. The planar illumination device according to claim 1, comprising
   another field lens provided between the condenser lens and the field lens and in parallel with the substrate,
   the other field lens is formed with lenticular lenses including grooves forming unevenness at an incident side and at an exit side, directions of the grooves being orthogonal to each other.

5. The planar illumination device according to claim 1, comprising
   an optical sheet composed of a polarization reflective sheet or a diffusion sheet, the optical sheet being disposed at an exit side of the field lens disposed inclined.

6. A planar illumination device illuminating a liquid crystal panel disposed inclined with respect to an optical axis, the planar illumination device comprising:
a plurality of light sources disposed two-dimensionally on a substrate, wherein the plurality of light sources allow for local dimming and are separately controlled;
a reflector disposed at an exit side of the substrate, the reflector having reflection surfaces surrounding each light source of the plurality of light sources;
a condenser lens disposed at an exit side of the plurality of light sources and configured to condense light exiting from the plurality of light sources; and
a field lens disposed at an exit side of the condenser lens and formed with a plurality of linear prisms configured to spread light incident from the condenser lens outward, wherein
the field lens is disposed along the liquid crystal panel attached externally.

7. The planar illumination device according to claim 6, wherein
the field lens is disposed in vicinity to the liquid crystal panel.

8. The planar illumination device according to claim 7, wherein
the field lens is in vicinity to the liquid crystal panel by 3 mm or less.

9. The planar illumination device according to claim 6, wherein
the field lens is disposed in parallel with the liquid crystal panel.

10. The planar illumination device according to claim 6, wherein
the substrate is disposed perpendicular to the optical axis.

11. The planar illumination device according to claim 6, wherein
the field lens is configured such that, among the light entered from the condenser lens, light incident on a center part of the entire width is emitted in a direction of the optical axis, and light incident on an outside of the center part is spread outward from the center part.

12. The planar illumination device according to claim 6, wherein
the plurality of linear prisms includes:
a plurality of first linear prisms that are formed adjacent to each other on an exit side of the field lens, and allow light distribution of light incident from the condenser lens to spread outward in a first direction, and
a plurality of second linear prisms that are formed adjacent to each other on a side of the field lens opposite the plurality of first linear prisms, and allow light distribution of light incident from the condenser lens to spread outward in a second direction orthogonal to the first direction.

13. The planar illumination device according to claim 6, wherein
the condenser lens is formed with linear Fresnel lenses.

14. The planar illumination device according to claim 6, wherein
the condenser lens is formed with linear Fresnel lenses including grooves forming unevenness at an incident side and at an exit side, directions of the grooves being orthogonal to each other, and
the field lens is formed with linear prisms including grooves forming unevenness at an incident side and at an exit side, directions of the grooves being orthogonal to each other.

15. The planar illumination device according to claim 6, comprising
another field lens provided between the condenser lens and the field lens and in parallel with the substrate,
the other field lens is formed with lenticular lenses.

16. A planar illumination device illuminating a liquid crystal panel disposed inclined with respect to an optical axis, the planar illumination device comprising:
a plurality of light sources disposed two-dimensionally on a substrate, wherein the plurality of light sources allow for local dimming and are separately controlled;
a reflector disposed at an exit side of the substrate, the reflector having reflection surfaces surrounding each light source of the plurality of light sources;
a condenser lens disposed at an exit side of the plurality of light sources and formed with a plurality of linear prisms configured to condense light exiting from the plurality of light sources; and
a field lens disposed at an exit side of the condenser lens and configured to spread light incident from the condenser lens outward, wherein
the field lens is disposed in vicinity to the liquid crystal panel attached externally.

17. The planar illumination device according to claim 16, wherein the field lens is in vicinity to the liquid crystal panel by 3 mm or less.

* * * * *